(12) United States Patent
Chiang et al.

(10) Patent No.: US 11,477,474 B2
(45) Date of Patent: Oct. 18, 2022

(54) METHODS AND APPARATUS FOR MULTI-HYPOTHESIS MODE REFERENCE AND CONSTRAINTS

(71) Applicant: MediaTek Inc., Hsin-Chu (TW)

(72) Inventors: Man-Shu Chiang, Hsin-Chu (TW); Chih-Wei Hsu, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/432,890

(22) Filed: Jun. 5, 2019

(65) Prior Publication Data
US 2019/0379901 A1 Dec. 12, 2019

Related U.S. Application Data

(60) Provisional application No. 62/682,224, filed on Jun. 8, 2018.

(51) Int. Cl.
H04N 11/02 (2006.01)
H04N 19/513 (2014.01)
H04N 19/176 (2014.01)

(52) U.S. Cl.
CPC ......... H04N 19/513 (2014.11); H04N 19/176 (2014.11)

(58) Field of Classification Search
CPC .................................................. H04N 19/513
USPC ....................................... 375/240.01–240.29
See application file for complete search history.

(56) References Cited

U.S. PATENT DOCUMENTS

| 2011/0002388 A1* | 1/2011 | Karczewicz | H04N 19/51 375/240.15 |
| 2011/0261882 A1* | 10/2011 | Zheng | H04N 19/105 375/240.13 |
| 2012/0263235 A1* | 10/2012 | Sugio | H04N 19/105 375/240.16 |
| 2013/0121416 A1* | 5/2013 | He | H04N 19/597 375/240.14 |

(Continued)

FOREIGN PATENT DOCUMENTS

| CN | 102934440 A | 2/2013 |
| CN | 104769947 A | 7/2015 |
| WO | WO 2017/197146 A1 | 11/2017 |

OTHER PUBLICATIONS

International Search Report and Written Opinion dated Aug. 22, 2019 in connection with International Application No. PCT/CN2019/090350.

(Continued)

Primary Examiner — Leron Beck
(74) Attorney, Agent, or Firm — Wolf, Greenfield & Sacks, P.C.

(57) ABSTRACT

The techniques described herein relate to methods, apparatus, and computer readable media configured to decode and/or encode video data. If the current coding block was using more than one hypotheses of prediction data to generate the prediction data, first prediction data is determined for a current coding block of a picture generated using a first prediction mode, and second prediction data is determined for the current coding block generated using a second prediction mode. Information derived from at least one of the first prediction mode and the second prediction mode can be stored. The stored information can be referenced by the subsequent coding blocks.

21 Claims, 11 Drawing Sheets

(56) References Cited

U.S. PATENT DOCUMENTS

| | | | | |
|---|---|---|---|---|
| 2014/0049605 A1* | 2/2014 | Chen | .................... | H04N 19/597 |
| | | | | 348/43 |
| 2014/0092978 A1* | 4/2014 | Bugdayci | ............... | H04N 19/30 |
| | | | | 375/240.16 |
| 2014/0376626 A1* | 12/2014 | Lee | ...................... | H04N 19/196 |
| | | | | 375/240.12 |
| 2015/0249833 A1* | 9/2015 | Tourapis | .............. | H04N 19/154 |
| | | | | 375/240.03 |
| 2015/0373366 A1* | 12/2015 | He | ...................... | H04N 19/521 |
| | | | | 375/240.16 |

OTHER PUBLICATIONS

Hsu, C., Description of Core Experiment 10: Combined and multi-hypothesis prediction, Joint Video Experts Team (JVET) of ITU-T SG 16 WP 3 and ISO/IEC JTC 1/SC 29/WG 1, $10^{th}$ Meeting: San Diego, CA, US, Apr. 20, 2018, 11 pages.

* cited by examiner

METHODS AND APPARATUS FOR MULTI-HYPOTHESIS MODE REFERENCE AND CONSTRAINTS

RELATED APPLICATIONS

This application claims priority under 35 U.S.C. § 119(e) to U.S. Provisional Application Ser. No. 62/682,224, filed on Jun. 8, 2018, entitled MULTI-HYPOTHESIS MODE REFERENCE AND CONSTRAINTS, which is herein incorporated by reference in its entirety.

TECHNICAL FIELD

The techniques described herein relate generally to video coding, and particularly to referencing multiple intra and/or inter hypotheses for subsequent coding, and related constraints.

BACKGROUND OF INVENTION

Various video coding techniques can be used to encode video, such as for storage and/or transmission. The video coding techniques can also provide for decoding the encoded video for playback. A video codec can include an electronic circuit and/or software that compresses and/or decompresses digital video. Various video coding standards exist, and video codecs typically comply with one or more video coding standards. In many video coding standards, Discrete Cosine Transform (DCT) and block-based motion estimation are used to achieve spatial and temporal compression, respectively. High-Efficiency Video Coding (HEVC), for example, is an international video coding standard developed by the Joint Collaborative Team on Video Coding (JCT-VC). HEVC is based on the hybrid block-based motion-compensated DCT-like transform coding architecture.

SUMMARY OF INVENTION

In accordance with the disclosed subject matter, apparatus, systems, and methods are provided for multi-hypothesis mode reference and constraints.

Some embodiments relate to a decoding method for decoding video data. The method includes determining if more than one hypothesis of prediction data are used for generating the prediction data of a current coding block of a picture. When more than one hypothesis of prediction data is used for prediction of the current coding block of the picture, the method includes determining first prediction data for the current coding block of the picture generated using a first prediction mode, determining second prediction data for the current coding block generated using a second prediction mode, and storing information derived from at least one of the first prediction mode and the second prediction mode.

In some examples, the information derived from both the first prediction mode and the second prediction mode is combined for the current coding block and storing the combined information.

In some examples, the first prediction data and the second prediction data are generated from different motion candidates, which are both generated using an inter prediction mode.

In some examples, a second coding block that is a subsequent coding block to the current coding block uses the stored information derived using at least one of the first prediction mode and the second prediction mode for the current coding block.

In some examples, determining the second prediction data for the current coding block generated using the second prediction mode includes generating the second prediction data using an intra prediction mode. A list of most probable modes used in intra prediction can be generated for a subsequent coding block to the current coding block according to the second prediction mode. The subsequent coding block can be decoded using intra prediction with the second prediction mode as a candidate.

In some examples, the first prediction data and/or second prediction data for the current coding block are determined based on a previous coding block. The current coding block and the previous coding block can belong to a same coding tree unit (CTU) and/or a same frame.

In some examples, wherein only when subsequent coding blocks and the current coding block belong to the same CTU and/or the same frame, the subsequent coding blocks can use at least part of the stored information derived from at least one of the first prediction mode and the second prediction mode.

In some examples, wherein when subsequent coding blocks and the current coding block belong to different CTUs and/or different frames, the subsequent coding blocks can use information excluding at least part of the stored information derived from at least one of the first prediction mode and the second prediction mode.

In some examples, the information derived from only one of the first prediction mode and the second prediction is stored.

In some examples, the stored information derived from at least one of the first prediction mode and the second prediction mode are used for the subsequent coding block to reference.

In some examples, the prediction data of the current coding block is generated using combining the first prediction data and the second prediction data with weighting.

Some embodiments relate to an apparatus configured to decode video data. The apparatus includes a processor in communication with memory, the processor being configured to execute instructions stored in the memory that cause the processor to determine if more than one hypothesis of prediction data are used for generating the prediction data of a current coding block of a picture. When more than one prediction data is used for prediction of the current coding block of the picture, the instructions cause the processor to determine first prediction data for the current coding block of the picture generated using a first prediction mode, determine second prediction data for the current coding block generated using a second prediction mode, and store information derived from at least one of the first prediction mode and the second prediction mode for the current coding block.

Some embodiments relate to an encoding method for encoding video data. The method includes generating first prediction data for a current coding block of a picture using a first prediction mode, generating second prediction data for the current coding block using a second prediction mode, and storing information derived from at least one of the first prediction mode and the second prediction mode.

In some examples, the first prediction data and the second prediction data are generated from different motion candidates, which are both generated using an Inter prediction mode. A second coding block that is a subsequent coding block to the current coding block can be encoded based on information derived using at least one of the first prediction mode and the second prediction mode. Combined prediction information can be generated using information derived using the first prediction mode and the second prediction mode, and a subsequent coding block can be encoded based on the combined prediction information.

In some examples, generating the second prediction data using the second prediction mode comprises generating the second prediction data using an intra prediction mode. A list of most probable modes used in intra prediction can be generated for a subsequent coding block to the current coding block according to the second prediction mode. The subsequent coding block can be encoded using intra prediction with the second prediction mode as a candidate.

In some examples, only when subsequent coding blocks and the current coding block belong to the same CTU and/or the same frame, the subsequent coding blocks uses at least part of the stored information derived from at least one of the first prediction mode and the second prediction mode.

In some examples, information derived from only one of the first prediction data and the second prediction data is stored.

In some examples, the information derived from at least one of the first prediction data and the second prediction data is used for the subsequent coding block to reference.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Techniques can be used to divide pictures into coding blocks, such as coding units (CUs) and/or prediction units (PUs). The coding blocks can be encoded and decoded using different inter prediction modes or intra prediction modes. However, only the information derived from one prediction mode is saved for each coding block that can be used by subsequent coding blocks. The techniques described herein provide for generating coding information for coding blocks (e.g., for PUs and/or CUs) using multiple hypotheses (e.g., different inter and/or intra prediction modes), and saving the coding information for the multiple hypotheses for use by subsequent coding blocks that will reference those coding blocks. In some embodiments, the multiple hypothesis (MH) mode can use two hypotheses. For example, for a MH intra mode that combines one hypothesis of prediction derived from an inter prediction mode and the other hypothesis of prediction derived from an intra prediction mode, the saved information can include motion information for one hypothesis and coding information generated using an intra prediction mode for the other hypothesis. As another example, for a MH inter mode that combines one hypothesis of prediction derived from an inter prediction mode and the other hypothesis of prediction derived from a different inter prediction mode, the saved information can include motion information for one hypothesis and motion information for the other hypothesis.

In some embodiments, constraints can be imposed when using multiple hypotheses techniques. For example, a buffer size constraint can be used when the second hypotheses is an inter prediction mode so that only motion information for one hypothesis is saved, which can prevent needing to double the buffer size used to store motion information. As another example, a coding tree unit (CTU) constraint can be used such that information of a block encoded with information from multiple hypotheses (e.g., including prediction information for a first hypothesis and prediction information for a second hypothesis) can be referenced only when the multiple-hypothesis block and the following coding units (e.g., PUs and/or CUs) that will reference the previous MH blocks are in the same CTU row. The CTU constraint can be applied to multi-hypothesis modes described herein, including where the second hypothesis is either an inter prediction mode or an intra prediction mode.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
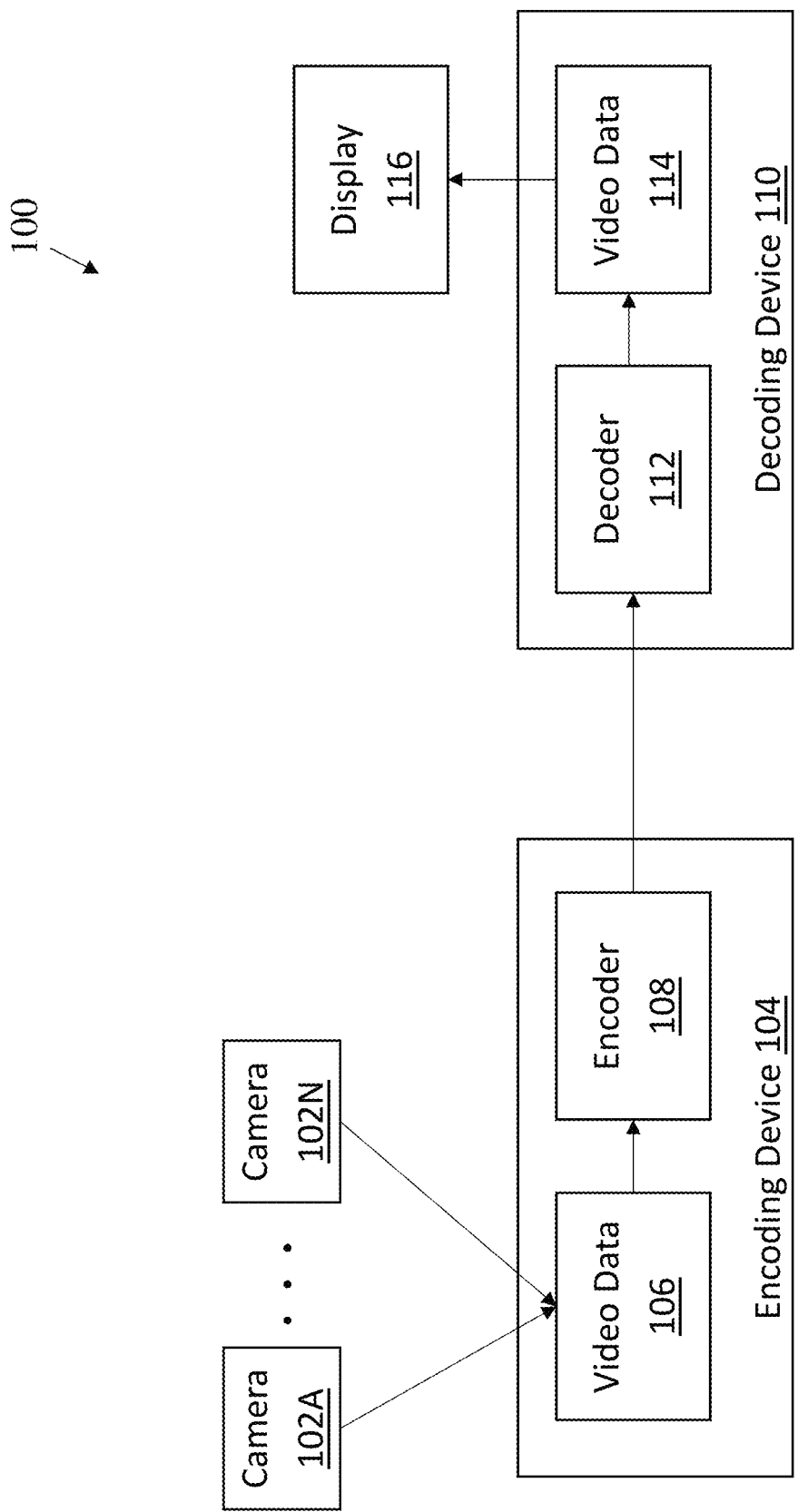
FIG. 1 shows an exemplary video coding configuration, according to some embodiments.

FIG. 1 shows an exemplary video coding configuration 100, according to some embodiments. The video coding configuration 100 includes one or more cameras 102A-102N, collectively referred to as cameras 102, that generate video data 106. The cameras 102 can be any type of camera, such as cameras that include audio recording capabilities, and/or separate cameras and audio recording functionality. The encoding device 104 includes an encoder 108. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video to generate video data 114. The display 116 displays the video data 114.

Figure 2:
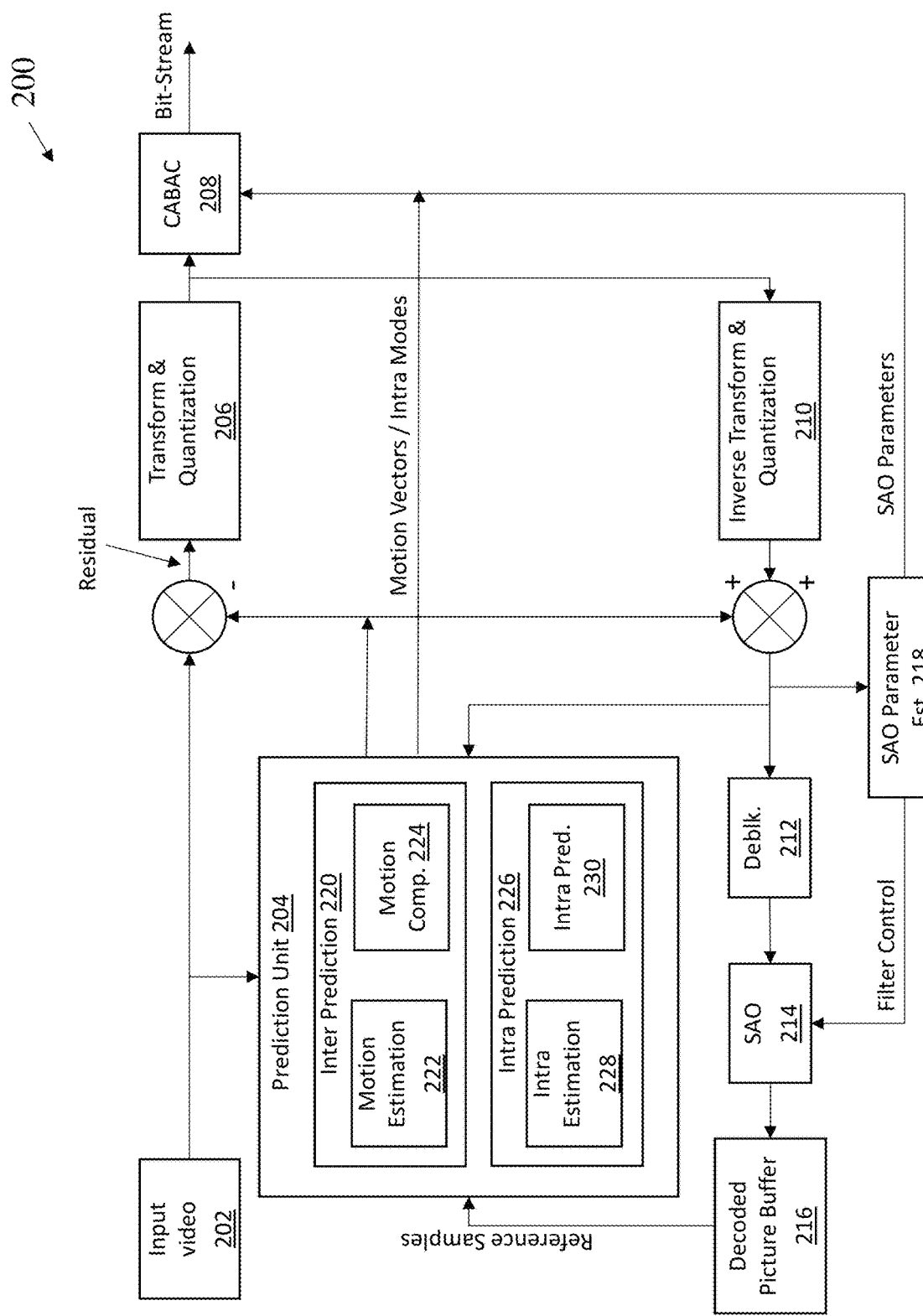
FIG. 2 shows aspects of an exemplary video encoder, according to some embodiments.

FIG. 2 shows aspects of an exemplary video encoder 200, according to some embodiments. The video encoder 200 receives the input video 202 and includes at least part of a prediction unit 204, a transform & quantization unit 206, a CABAC unit 208, an inverse Transform & quantization unit 210, a deblocking unit 212, SAO unit 214, a decoded picture buffer 216, and a SAO parameter estimation unit 218. The prediction unit 204 includes inter-prediction processing 220, which includes motion estimation unit 222 and motion compensation unit 224, and intra-prediction processing 226, which includes intra estimation unit 228 and intra prediction unit 230. In other embodiments, the video encoder 200 may include more, fewer, and/or different components than those illustrated in FIG. 2.

For block-based motion compensation, a basic unit for compression is the CU, which can be a 2N×2N square block. Each CU can be recursively split into four smaller CUs until the predefined minimum size is reached. Each CU may contain one or multiple PUs. If one CU contains only one PU, PU can be viewed same as CU. The video encoder 200 may encode CUs. As part of the encoding process for a CU, the prediction unit 204 may partition the CUs into one or more PUs.

The prediction unit 204 can perform inter prediction using inter prediction unit 220. The inter prediction processing can include generating predictive data for a PU by performing inter prediction on each PU of a CU. Depending on the type of inter prediction, the motion estimation unit 222 may search reference samples from the decoded picture buffer 216, including reference samples from either the List0 or List1. The motion estimation unit 222 can generate reference picture indexes for the positions in List0 and/or List1, and can generate motion vectors to indicate displacements between the reference location and a sample block of the PU. The motion compensation unit 224 can generate the predictive sample blocks of the PU based at least in part on actual or interpolated samples at the reference region indicated by the motion vector of the PU.

The prediction unit 204 can perform intra prediction using intra prediction unit 226. The intra prediction processing can include generating predictive data for a PU by performing intra prediction on the PU. The predictive data for the PU may include predictive blocks for the PU and various syntax elements. The prediction unit 204 may select the predictive data for PUs from among the predictive data generated by inter prediction processing or the predictive data generated by intra prediction processing. In some embodiments, the prediction unit 204 includes a multi-hypothesis (MH) mode, as discussed further herein. In some embodiments, MH mode can be an independent mode from inter or intra prediction. In some embodiments, MH mode can may be part of inter and/or intra prediction. For example, MH mode (viewed as an inter mode) can add one additional hypothesis of prediction on top of one existing hypothesis of prediction derived from inter prediction mode. For another example, MH mode (viewed as intra mode) can add one additional hypothesis of prediction on top of one existing hypothesis of prediction derived from intra prediction mode.

The transform & quantization unit 206 can generate transform coefficients for each TU by applying a transform mode (e.g., DCT, DST or any other type of transform), and can quantize the transform coefficients. The CABAC unit 208 entropy codes the quantized transform coefficients by performing a Context-Adaptive Binary Arithmetic Coding (CABAC) on the quantized transform coefficients and/or any other side information for generating the bit-stream. In some other embodiments, the CABAC unit 208 can be replace with other entropy coding unit to generate the entropy-coded data. The encoder 200 can output the entropy-coded transform coefficients in a bit stream.

The inverse transform & quantization unit 210 can apply inverse quantization and inverse transform mode transforms (e.g., inverse DCT, DST or any other type of inverse transform) to reconstruct a residual block from the coefficient block. The deblocking unit 212 can perform one or more deblocking operations on the reconstructed blocks. The SAO unit 214 and SAO parameter estimation unit 218 implement sample adaptive offset (SAO), which is an in-loop filtering technique. The SAO process can include classifying reconstructed samples into different categories, obtaining an offset for each category, and then adding the offset to each sample of the category. The offset of each category can be signaled to the decoder to reduce sample distortion.

The decoded picture buffer 216 can store the reconstructed, SAO processed, blocks. As described herein, the prediction unit 204 can use the reconstructed blocks to perform inter prediction and/or intra prediction.

Figure 3:
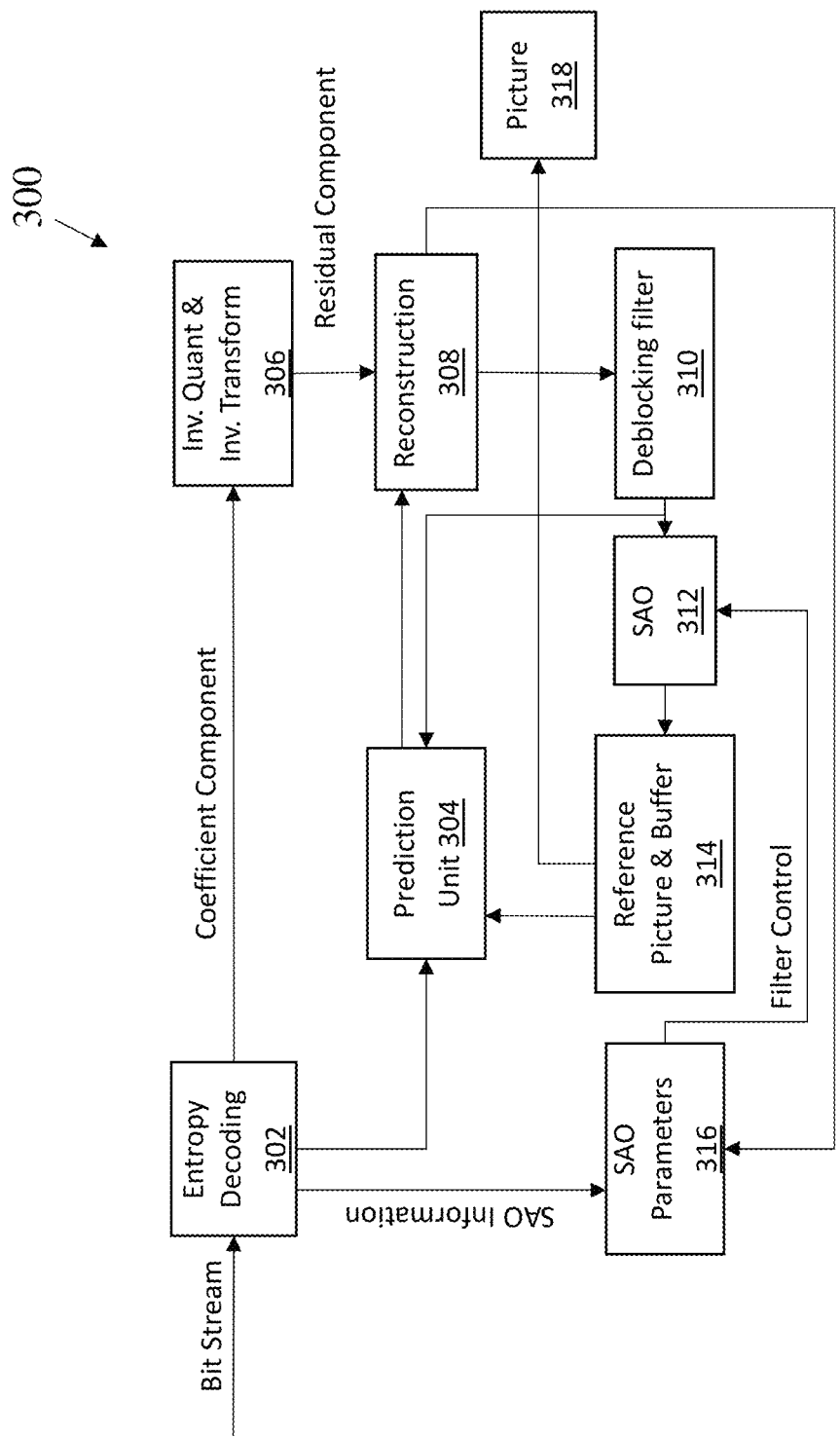
FIG. 3 shows aspects of an exemplary video decoder, according to some embodiments.

FIG. 3 shows aspects of an exemplary decoder 300, according to some embodiments. The decoder 300 includes at least some of an entropy decoding unit 302, a prediction unit 304, an inverse quantization and inverse transform unit 306, a reconstruction unit 308, a deblocking filter 310, a SAO unit 312, a reference picture and buffer 314, and a SAO parameter unit 316. For exemplary purposes, FIG. 3 is discussed in conjunction with HEVC, although it should be appreciated that the techniques can be applied to other video coding standards. In other embodiments, the video decoder 300 may include more, fewer, and/or different components than those illustrated in FIG. 3.

The entropy decoding unit 302 parses the bit stream to decode the syntax elements. The prediction unit 304 can construct one or more reference picture lists, such as List0 and/or List1, e.g., using syntax elements signaled in the bit stream. The prediction unit 304 can perform motion compensation and/or intra prediction. For example, if a PU is encoded using inter prediction, the prediction unit 304 may extract motion information for the PU, which can be used to determine one or more reference regions for the PU. The prediction unit 304 can generate, based on samples blocks at the one or more reference blocks, predictive blocks for the PU. As another example, if a PU is encoded using intra prediction, the prediction unit 304 can perform intra prediction to generate predictive blocks for the PU based on neighboring PUs. In some embodiments, the prediction unit 304 includes a multiple-hypothesis (MH) mode processing, as discussed further herein. In some embodiments, the MH mode processing can be an independent from inter or intra prediction processing. In some embodiments, the MH mode processing can be part of inter and/or intra prediction. For example, MH mode (viewed as an inter mode) can add one additional hypothesis of prediction on top of one existing hypothesis of prediction derived from inter prediction mode. For another example, MH mode (viewed as intra mode) can add one additional hypothesis of prediction on top of one existing hypothesis of prediction derived from intra prediction mode.

The inverse quantization and inverse transform unit 306 may inverse quantize a coefficient block and may apply an inverse transform to generate a residual block. The reconstruction unit 308 may reconstruct the coding blocks.

Reconstruction unit 308 may use the transform block (e.g., luma, Cb and Cr transform blocks) associated with TUs of a CU and the predictive blocks (e.g., luma, Cb and Cr predictive blocks) of the PUs of the CU, i.e., either intra-prediction data and/or inter-prediction data, as applicable, to reconstruct the coding blocks (e.g., luma, Cb and Cr coding blocks) of the CU. For example, reconstruction unit 308 may add samples (residual component) of the transform blocks, such as luma, Cb and Cr transform blocks, to corresponding samples (predictor component) of the predictive blocks to reconstruct the coding blocks of the CU.

The deblocking filter 310 can perform a deblocking operation to reduce blocking artifacts associated with the coding blocks. The SAO unit 312 and the SAO parameter unit 316 implement the SAO in-loop filter. The offset of each SAO category can be signaled to the decoder 300, which the decoder can use to reduce sample distortion. The reference picture and buffer 314 can store the resulting deblocked, SAO processed coding blocks. The buffer 314 can provide reference pictures for subsequent motion compensation, intra prediction, and presentation of pictures as shown via picture 318.

To achieve the best coding efficiency of hybrid coding architecture in HEVC, there are two kinds of prediction modes for each PU, which the intra prediction and inter prediction modes. For intra prediction modes, the spatial neighboring reconstructed pixels can be used to generate the directional predictions. There can be up to multiple directions (e.g. 33, 65, or more), as discussed further herein. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide the MVP in Inter AMVP mode, the advanced motion vector prediction (AMVP) scheme is used to select a motion vector predictor among an AMVP candidate set including two spatial MVPs and one temporal MVP. So, in AMVP mode, an MVP index for the MVP and the corresponding MVDs are encoded and transmitted. In addition, the inter prediction direction to specify the prediction directions among bi-prediction and uni-prediction, which are List0 (L0) and List1 (L1), accompanied with the reference frame index for each list may also be encoded and transmitted.

When a CU/PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Figure 4:
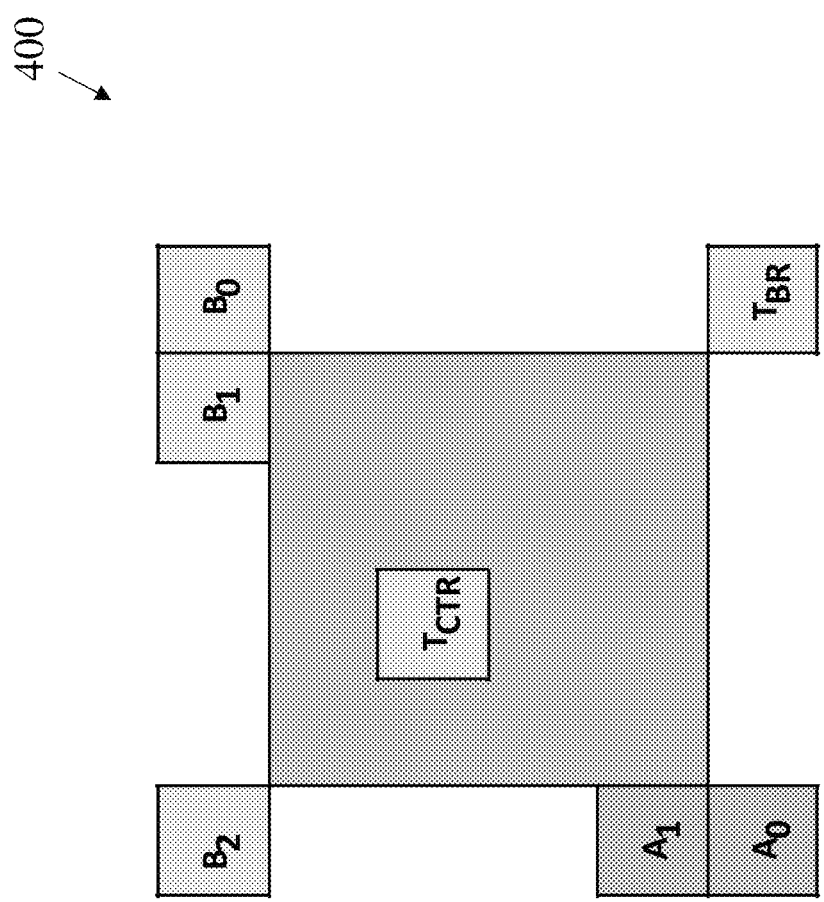
FIG. 4 is a diagram showing the coding unit or prediction unit referred to derive the spatial and temporal motion vector predictors for advanced motion vector prediction and/or merge schemes, according to some examples.

FIG. 4 is a diagram 400 showing the neighboring PUs referred to derive the spatial and temporal MVPs for both AMVP and Merge scheme, according to some examples. In AMVP, the left MVP is the first available one from A0, A1, the top MVP is the first available one from B0, B1, B2, and the temporal MVP is the first available one from TBR or TCTR (TBR is used first, if TBR is not available, TCTR is used instead). If the left MVP is not available and the top MVP is not scaled MVP, the second top MVP can be derived if there is a scaled MVP among B0, B1, and B2. The list size of MVPs of AMVP is 2 in HEVC. Therefore, in some examples, after the derivation process of the two spatial MVPs and one temporal MVP only the first two MVPs can be included in the MVP list. If after removing redundancy, the number of available MVPs is less than two, zero vector candidates are added to the candidates list.

For Skip and Merge mode, as shown in FIG. 4, up to four spatial Merge indexes are derived from A0, A1, B0 and B1, and one temporal Merge index is derived from TBR or TCTR (TBR is used first, if TBR is not available, TCTR is used instead). Note that if any of the four spatial Merge indexes is not available, then the position B2 can be used to derive the Merge index as a replacement. After the derivation process of the four spatial Merge indexes and the one temporal Merge index, any remove redundant Merge indexes can be removed. If after removing redundancy, the number of available Merge index is smaller than five, three types of additional candidates can be derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

Figure 5:
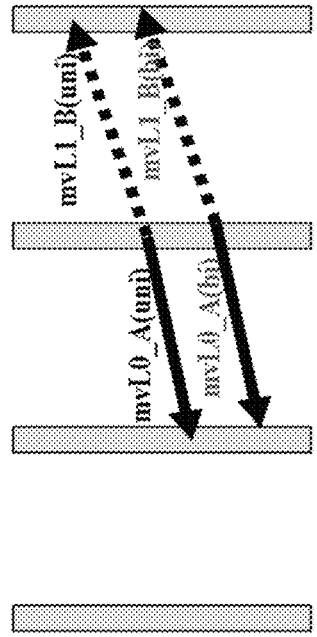
FIG. 5 shows an exemplary diagram of the derivation process of combined bi-predictive merge candidate, according to some examples.

In candidate type 1, combined bi-predictive Merge candidates are created by combining the original Merge candidates. In particular, two candidates in the original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. An exemplary diagram 500 of the derivation process of combined bi-predictive Merge candidate is shown in FIG. 5, wherein A and B indicates different neighboring blocks of the current block (as shown in FIG. 4). The merge candidate with merge index 0, which is an uni-predictive candidate for list 0, and the merge candidate with merge index 1, which is an uni-predictive candidate for list 1, form the merge candidate with merge index 2, which is a bi-predictive candidate.

Figure 6:
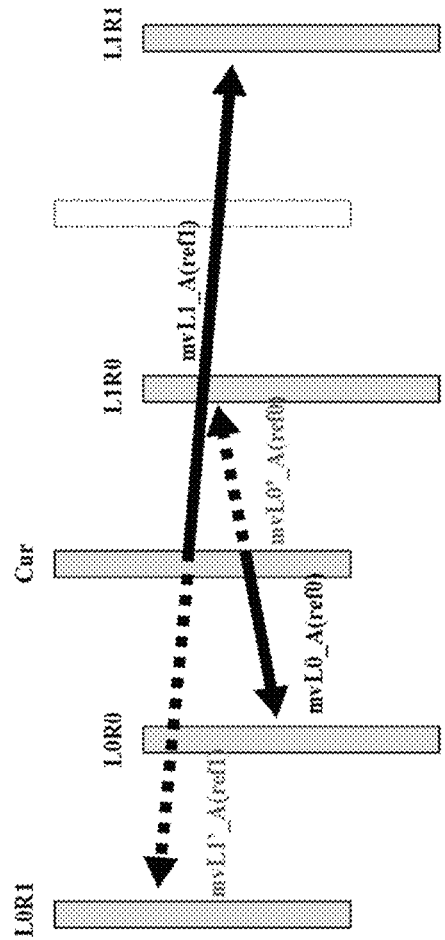
FIG. 6 shows an exemplary diagram of the derivation process of the scaled bi-predictive merge candidates, according to some examples.

In candidate type 2, scaled bi-predictive Merge candidates are created by scaling original Merge candidates. In particular, one candidate in the original candidates, which has mvLX (the motion vector in list X) and refIdxLX (the reference picture index in list X), X can be 0 or 1, is used to created bi-predictive Merge candidates. For example, one candidate A is list 0 uni-predictive with mvL0_A and ref0. To scale Candidate A, ref0 is firstly copied to reference index ref0' in list 1. After that, mvL0'_A is calculated by scaling mvL0_A with ref0 and ref0'. And then, the bi-predictive Merge candidate which has mvL0_A and ref0 in list 0 and mvL0'_A and ref0' in list 1, is created and added into the Merge candidate list. An example diagram 600 of the derivation process of the scaled bi-predictive Merge candidate is shown in FIG. 6. The original merge candidate list 602 includes mvL0_A at reference index 0 (ref0) in List 0, and mvL1_A at reference index 1 (ref1) in List 1. FIG. 6 shows five frames, including the current frame Cur, List 0

Reference 0 (L0R0), List 0 Reference 1 (L0R1), List 1 Reference 0 (L1R0) and List 1 Reference 1 (L1R1). Ref0 is firstly copied to reference index ref0' (reference index 2) in list 1. After that, mvL0'_A is calculated by scaling mvL0_A with ref0 and ref0'. Similarly, mvL1_A is copied to reference index ref1' (reference index 3) in list 0. After that, mvL1'_A is calculated by scaling MVL1'_A with ref1 and ref1'. Therefore, after adding scaled candidates, the merge candidate list 604 also includes MVL0'_A at ref0' and MVL1'_A at ref1'.

Figure 7:
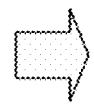
FIG. 7 is an example diagram showing zero vector merge candidate and zero vector advanced motion vector prediction candidates.
Figure 7:
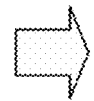

In candidate type 3, Zero vector Merge/AMVP candidates are created by combining zero vectors and reference indexes that can be referred. FIG. 7 shows an example diagram 700 for zero vector Merge candidate and zero vector AMVP candidates. If zero vector candidates are not duplicated, they are added to Merge/AMVP candidates list. As shown in FIG. 7, for Merge mode, the original merge candidate list 702 includes three merge candidates, mvL0_A in List 0 at merge index 0, mvL1_B in List 1 at merge index 1, and mvL0_A in List 0 with MVL1 B in List 1 at merge index 2. As shown in the merge candidate list after adding zero candidates 704, zero vectors (0,0) are added to both List 0 and List 1 to form the remaining two merge candidates at reference index 3 and 4. For AMVP mode, the original AMVP candidate list 706 includes mvL0_A in List 0 at index 0, mvL0 B in List 0 at index 1, and mvL1_A in List 1 at index 0. Zero vector (0,0) is added to each List 0 (at index 2) and List 1 (at index 1) to generate the AMVP candidate list 708.

Figure 8:
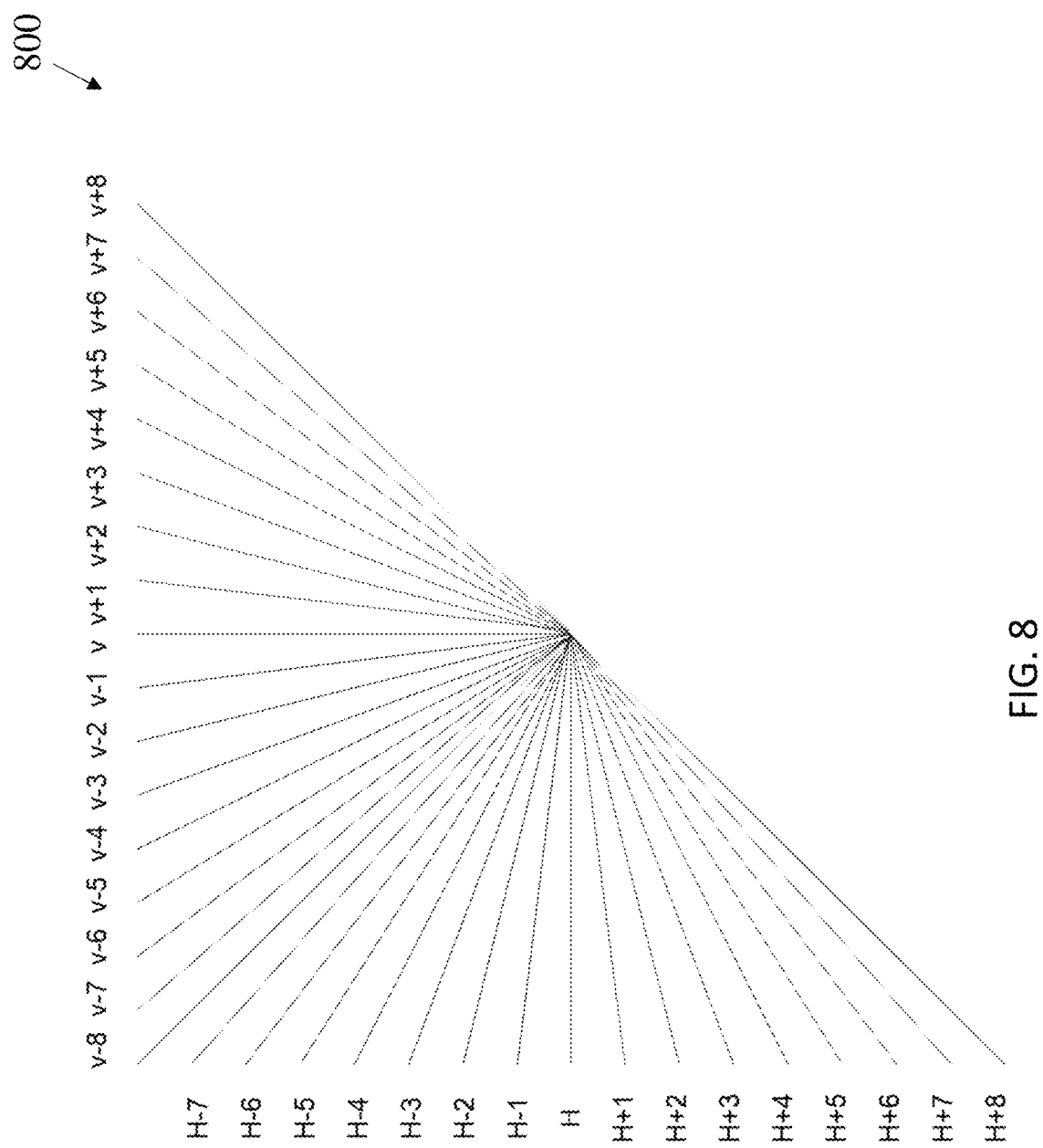
FIG. 8 is a diagram showing thirty-three directions for intra prediction, according to some examples.

When a PU is coded in Intra mode, traditionally the intra prediction method only exploits one reference tier adjacent to the current PU and one of the intra prediction modes to generate the predictors for the current PU. For intra prediction modes, the spatial neighboring reconstructed pixels can be used to generate the directional predictions. Multiple directions (e.g. 33, 65, or more) can be used. Here take intra prediction modes in HEVC as an example. There are up to 33 directions, planar mode, and DC mode in HEVC. Out of all 35 intra prediction modes in HEVC, three modes are considered to be the most probable modes (MPM) for predicting the intra prediction mode in current prediction block. These three modes are selected as the MPM set. For example, the intra prediction modes used in the left prediction block, in the above prediction block, and in case the intra prediction modes in the two neighboring blocks are identical and both directional, or only one of the two neighboring blocks is available and coded in intra prediction and at the same time this intra prediction mode is directional, the two neighboring directions immediately next to this direction is also used in MPM. DC mode and Planar mode are also considered in the MPM set to fill the available spot(s) in the MPM, especially if the above or top neighboring blocks are not available or not coded in intra prediction, or the intra prediction modes in neighboring blocks are not directional. If the intra prediction mode for the current prediction block is one of the modes in the MPM set, 1 or 2 bins is used to signal which one it is. Otherwise, if it is not the same as any entry in the MPM set, it will be coded as a non-MPM mode. There are all-together 32 such non-MPM modes and a (5-bit) fixed length coding method is applied to signal this mode. The 33 directions are illustrated in the diagram 800 in FIG. 8. In FIG. 8, there are all together 33 directional modes, so H, H+1~H+8, H−1~H−7, V, V+1~V+8, V−1~V−8 are used. This system can be expanded to a general case, where horizontal and vertical modes are represented as H and V modes. For other directional modes, they can be represented either as H+k or V+k modes, where k=+−1, +−2, . . . , and so on. For example, if 65 directional modes are used, k can be range from +−1 to +−16.

The techniques described herein provide for a multi-hypothesis (MH) mode. MH mode combines an existing prediction mode (e.g., inter or intra prediction mode) with an extra prediction (e.g., an extra merge indexed prediction, and saves the information of both hypotheses for use by subsequent coding blocks (e.g., PUs/CUs) that will reference the blocks coded using MH mode. In some embodiments, a flag can be signaled to indicate whether MH mode is enabled. If MH mode is enabled, in some embodiments an additional index (or indexes) can be signaled to indicate the extra prediction. In some other embodiments, for MH mode, multiple hypothesis of prediction are used for generating the final prediction to the current block.

In some embodiments, MH mode can be used to improve inter prediction. In some embodiments, the MH mode can be used to improve Skip and/or Merge modes. In existing implementations of Skip and Merge mode, one Merge index will be used to select one motion candidate, which may be either uni-prediction or bi-prediction derived by the candidate itself. The generated motion compensated predictor can be thought of as a first (one) hypothesis. For MH mode, the techniques produce a second hypothesis and/or additional hypotheses. The second hypothesis of predictors can be generated, for example, by motion compensation from Merge or Skip mode, or can be generated by an Intra prediction mode from Intra mode. When multiple hypotheses of predictors are obtained, simple average or weighted sum of these hypothesis can be used to generate the final predictors.

The encoder and/or decoder can save the information of the hypotheses. In some embodiments, the PU, which selects MH mode, can save the information of the second hypothesis in addition to that of the first hypothesis. For purposes of ease of explanation, some examples described herein discuss using two hypotheses, although this is for exemplary purposes only, and it should be understood that any additional number of hypotheses can be used without departing from the techniques described herein.

In some embodiments, when the second hypothesis of predictors is generated by motion compensation (e.g., by motion compensation unit 224 in the encoder 200 in FIG. 2 and/or prediction unit 304 in the decoder 300 in FIG. 3), the motion information for the first and/or second hypothesis of predictors can be saved for reference by subsequent coding blocks (e.g., PUs/CUs) using appropriate prediction mode to reference the blocks coded using MH mode.

In some embodiments, when the second hypothesis of predictors is generated by an intra prediction mode, the motion information for the first hypothesis and/or the Intra prediction mode for the second hypothesis of predictors can be saved for reference by subsequent coding blocks using Intra prediction mode that will reference the blocks coded using MH mode.

In some embodiments, when the second one hypothesis of predictors is generated by motion compensation, the motion information for the first and/or second hypothesis of predictors can be saved for reference by subsequent coding blocks (e.g., PUs/CUs) using Inter prediction mode that will reference the blocks coded using MH mode. The motion information of the two hypothesis of predictors can be used separately. For example, for a inter CU/PU (e.g. merge CU/PU), the spatial MVP can be derived from neighboring blocks. If the referenced neighboring block is coded with MH mode, whose second hypothesis of predictors is generated by motion compensation, two sets of motions from two hypothesis can be regarded as two individual candidate MVPs (e.g., for reference using Inter prediction mode). Therefore, the neighboring block will have more than one motion candidates that can be used for the current block. For another example, for a inter CU/PU (e.g. merge CU/PU), the temporal MVP can be derived from collocated blocks. If the referenced collocated block is coded with MH mode, whose second hypothesis of predictors is generated by motion compensation, two sets of motions from two hypothesis can be regarded as two individual candidate MVPs (e.g., for reference using Inter prediction mode). Therefore, the collocated block will have more than one motion candidates that can be used for the current block.

In some embodiments, when the second hypothesis of predictors is generated by motion compensation, the motion information for the second hypothesis of predictors can be saved for reference by subsequent coding blocks using Inter prediction mode that will reference the blocks coded using MH mode. In some embodiments, the motion information of the two hypothesis of predictors can be used to generate new combined motion information. For example, for a inter CU/PU (e.g. merge CU/PU), the spatial MVP can be derived from neighboring blocks. If the referenced neighboring block is coded with Multi-hypothesis mode, whose second hypothesis of predictors is generated by motion compensation, two sets of motions from two hypothesis, can be combined to generate one new candidate MVP. The combined method can be simple average or weighted sum or what Additional bi-predictive Merge candidates used. An example of the combined method is as follows. One uni-prediction motion from List 0 and one uni-prediction motion from List 1 can form one bi-prediction motion. For another example, for a inter CU/PU (e.g. merge CU/PU), the temporal MVP can be derived from collocated blocks. If the referenced collocated block is coded with Multi-hypothesis mode, whose second hypothesis of predictors is generated by motion compensation, two sets of motions from two hypothesis, can be combined to generate one new candidate MVP. The combined method can be simple average or weighted sum or what Additional bi-predictive Merge candidates used. An example of the combined method is as follows. One uni-prediction motion from List 0 and one uni-prediction motion from List 1 can form one bi-prediction motion.

In some embodiments, when the second one hypothesis of predictors is generated by an Intra prediction mode, the Intra prediction mode can be saved for reference by subsequent coding blocks using Intra prediction mode that will reference the blocks coded using MH mode. For an Intra PU, the MPM would be derived from neighboring blocks. If the referenced neighboring block is coded with Multi-hypothesis mode whose second hypothesis of predictors is generated by an Intra prediction mode, the Intra prediction mode used to generate the second hypothesis of predictors can be inserted into the MPM list. The to-be-inserted position can be the same as where the Intra prediction mode from normal Intra mode would be added, or the Intra prediction mode from the Multi-hypothesis mode can be inserted prior to that from normal Intra mode, or the Intra prediction mode from the Multi-hypothesis mode can be inserted after that from normal Intra mode.

In some embodiments, when the second one hypothesis of predictors is generated by an Intra prediction mode, the Intra prediction mode can be saved for reference by subsequent coding blocks that will reference the blocks (e.g., for reference using Intra prediction mode). For an Intra PU, the MPM would be derived from neighboring blocks. If the referenced neighboring block is coded with Multi-hypothesis mode whose second hypothesis of predictors is generated by an Intra prediction mode, the Intra prediction mode used to generate the second hypothesis of predictors needs to be mapped in case of its range of Intra directional modes is different from that for normal Intra mode. One possible mapping method is to build a predetermined table to correspond the Intra directional mode from Multi-hypothesis mode to the Intra directional mode within the current-used range of Intra directional modes from normal Intra mode.

In some embodiments, when the information of the second hypothesis is referenced by the following CU/PUs, reference frame constraints can be applied. For example, if the collocated CU/PUs from reference frames are coded using a multi-hypothesis mode where both the first and the second hypotheses generate motion information, only one set of motion data from either the first or the second hypothesis can be referenced by a following CU/PU. This can prevent the original buffer size for storing motion information for temporal references from doubling. In still another embodiment, CTU constraints can be applied. For example, if the neighboring CU/PUs in the same frame are coded using multi-hypothesis mode, the intra mode or motions from the second hypothesis can be referenced only when the CU/PUs belong to the same CTU as the current CU/PU. Thus, the information of a multi-hypothesis block (e.g., including the information for the first hypo. and/or the information for the second hypo) can be constrained such that it can be referenced only when the MH block and the following PUs/CUs (which are going to reference the previous MH blocks) are in the same CTU row. This can prevent the CTU line buffer from storing the intra mode or motion data. A CTU constraint can be applied to either a MH inter mode (where the second hypothesis derived from inter prediction) or MH intra mode (where the second hypothesis derived from intra prediction).

Any of the foregoing proposed methods can be implemented in encoders and/or decoders. For example, any of the proposed methods can be implemented in an inter coding module or intra coding module of an encoder, a motion compensation module, a merge candidate derivation module of a decoder. Alternatively, any of the proposed methods can be implemented as a circuit coupled to the inter coding module or intra coding module of an encoder and/or motion compensation module, a merge candidate derivation module of the decoder.

As described herein, the techniques for MH mode can be used in various video coding standards. While some examples discussed herein use HEVC as an example, it should be understood that other video coding standards can use the techniques described herein as well.

In some embodiments, MH mode with the second hypothesis of predictors generated from an intra prediction mode is used as a combined inter merge/intra prediction (CIIP) mode. In some embodiments, motion information from merge mode is used to generate the first hypothesis of predictors, and the intra prediction mode (e.g. planar mode) is used to generate the second hypothesis of predictors for CIIP mode. When coding a coding unit (e.g., CU) using CIIP mode, the motion information and/or the intra prediction mode can be saved for reference by the following CUs.

Figure 9:
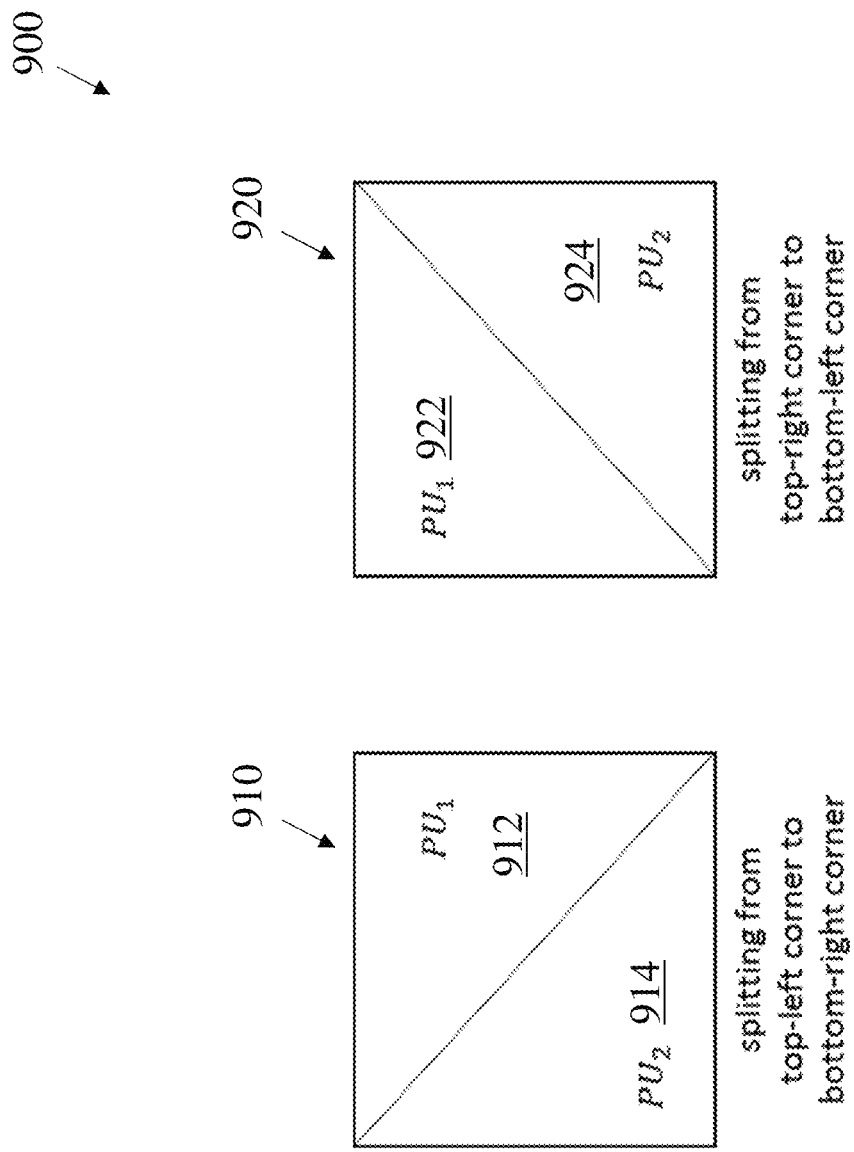
FIG. 9 shows diagram of how a CU can be split for a triangle prediction mode, according to some examples.

In some embodiments, MH mode with the second hypothesis of predictors generated by an inter prediction mode is used as a triangle prediction mode (TPM). In some embodiments, TPM splits a CU into two triangular prediction units as shown in the diagram 900 in FIG. 9. The CU can be split in different directions. As shown in split 910, the CU can be split from the top-left corner to the bottom-right corner, resulting in $PU_1$ 912 and $PU_2$ 914. As shown in split 920, the CU can be split from the top-right corner to the bottom-left corner, resulting in $PU_1$ 922 and $PU_2$ 924. Each triangular prediction unit can use uni-prediction motion. An adaptive weighting process can be performed to the diagonal edge after predicting the two triangular prediction units. In some embodiments, uni-prediction motion is stored for the non-weighted area, and bi-prediction motion, which is formed by the uni-prediction motions used in at least one of the two triangular prediction units, is stored for the weighted area. For example, for a inter CU/PU (e.g. merge CU/PU), the spatial MVP can be derived from neighboring blocks. If the referenced neighboring block is within the non-weighted area of the CU/PU coded with TPM, the stored uni-prediction can be referenced. For another example, for a inter CU/PU (e.g. merge CU/PU), the temporal MVP can be derived from collocated blocks. If the referenced collocated block is within the non-weighted area of the CU/PU coded with TPM, the stored uni-prediction can be referenced. For another example, for a inter CU/PU (e.g. merge CU/PU), the spatial MVP can be derived from neighboring blocks. If the referenced neighboring block is within the weighted area of the CU/PU coded with TPM, the stored bi-prediction can be referenced. For another example, for a inter CU/PU (e.g. merge CU/PU), the temporal MVP can be derived from collocated blocks. If the referenced collocated block is within the weighted area of the CU/PU coded with TPM, the stored bi-prediction can be referenced.

Figure 10:
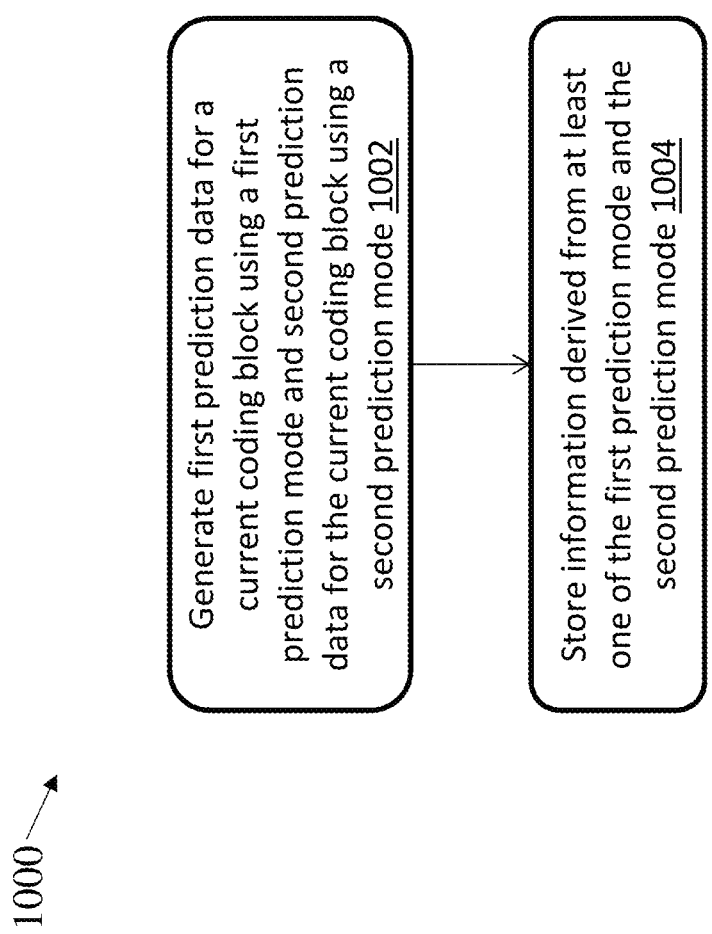
FIG. 10 shows an exemplary encoding process for encoding video data using a multiple-hypothesis mode, according to some embodiments.

As described herein, the techniques can be used in an encoder or a decoder. FIG. 10 shows an exemplary encoding process 1000 for encoding video data using a multiple-hypothesis mode, according to some embodiments. The encoding process 1000 can be performed, for example, by the encoding device 104 shown in FIG. 1. At step 1002, the encoder generates first prediction data for a current coding block (e.g., a PU) of a picture using a first prediction mode, and generates second prediction data for the current coding block using a second prediction mode. While step 1002 show a single step for generating the first and second prediction data, this is for illustrative purposes, since the first and second prediction data can be generated at the same stage or different stages. As discussed herein, the second prediction mode can be an inter prediction mode or an intra prediction mode. At step 1004, the encoder stores information derived from at least one of the first prediction data and the second prediction data.

Figure 11:
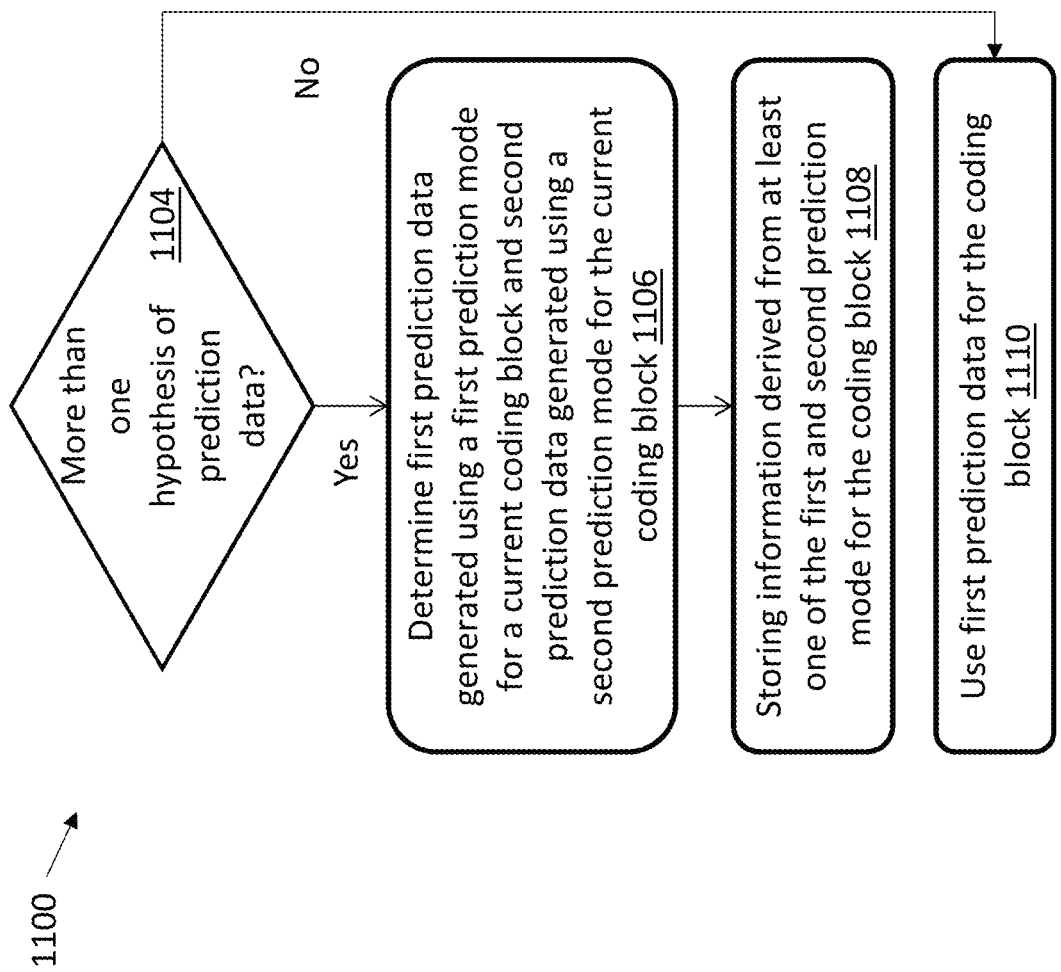
FIG. 11 shows an exemplary decoding process for decoding video data using a multiple-hypothesis mode, according to some embodiments.

FIG. 11 shows an exemplary decoding process 1100 for decoding video data using a multiple-hypothesis mode, according to some embodiments. At step 1104, the decoding device determines if more than one hypothesis of prediction data are used for prediction of a current coding block of a picture. If yes, the method proceeds to step 1106 and the decoder determines first prediction data generated using a first prediction mode for a current coding block and second prediction data using a second prediction mode that is different than the first prediction mode. At step 1108, the decoder stores information derived from at least one of the first prediction mode and second prediction mode for the coding block. Referring back to step 1104, if the current coding block was not coded using multiple hypotheses, the method proceeds to step 1110 and uses the first prediction mode for the current coding block. While steps 1104 and 1106 show steps for determining the first and second prediction data, this is for illustrative purposes, since the first and second prediction data can be determined at the same stage or at different stages. For example, the decoder can determine (e.g., using a flag) that the block is coded using multiple hypotheses and determine the first prediction data and determine the second prediction data at the same stage or at several separate stages or any combination of these steps.

As an illustrative example, a decoder can be configured to use CIIP to decode video data. For a merge CU, a CIIP flag can be signaled to indicate whether CIIP is applied to this merge CU. If the flag indicates CIIP is applied (e.g., the flag is true), the decoder can use a motion candidate to generate the first hypothesis, and determines an additional hypothesis of prediction from planar mode. Then, the decoder combines the two hypotheses as the final prediction for this merge CU (e.g., by averaging the two hypotheses or computing a weighted sum of the hypothesis).

As another illustrative example, a decoder can be configured to use TPM to decode video data. For a merge CU, when the decoder determines that TPM is applied to this merge block, the decoder generates one hypothesis from motion candidate one and one additional hypothesis from motion candidate two. The motion candidate one is different from the motion candidate two. Then, the decoder combines the two hypotheses as the final prediction for this merge CU.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   decoding a current coding block of a picture of the video data, comprising:
      determining whether both inter prediction and intra prediction are used for generating a single set of combined prediction samples used to reconstruct the current coding block of the picture;
      upon determining that both inter prediction and intra prediction are used for generating the single set of combined prediction samples of the current coding block of the picture:
         determining, based on at least one reconstructed reference frame, first prediction samples for the current coding block generated using a first prediction mode, wherein the first prediction mode comprises an inter-prediction merge mode;
         determining, based on at least one spatial neighboring block to the current coding block, second prediction samples for the current coding block generated using a second prediction mode, wherein the second prediction mode comprises an intra prediction mode;
         combining the first prediction samples and the second prediction samples to generate the single set of combined prediction samples for the current coding block;
         storing first information derived from the first prediction mode, second information referring to the second prediction mode, or both; and
         reconstructing the current coding block based on the single set of combined prediction samples for the current coding block of the picture.

2. The decoding method of claim 1, wherein a second coding block that is a subsequent coding block to the current coding block uses the stored first information derived from the first prediction mode, the second information referring to the second prediction mode, or both.

3. The decoding method of claim 1, further comprising generating a list of most probable modes used in intra prediction for a subsequent coding block to the current coding block according to the second prediction mode.

4. The decoding method of claim 3, further comprising decoding the subsequent coding block using intra prediction with second information derived from prediction data determined based on at least one spatial neighboring block to the current coding block as a candidate.

5. The decoding method of claim 1, wherein the at least one spatial neighboring block to the current coding block is a previous coding block.

6. The decoding method of claim 5, wherein the current coding block and the previous coding block belong to a same coding tree unit (CTU), a same frame, or both.

7. The decoding method of claim 1, wherein only when subsequent coding blocks and the current coding block belong to the same CTU, the same frame, or both, the subsequent coding blocks uses at least part of the stored first information derived from the first prediction mode, the second information referring to the second prediction mode, or both.

8. The decoding method of claim 1, wherein when subsequent coding blocks and the current coding block belong to different CTUs, different frames, or both, the subsequent coding blocks uses information excluding at least part of the stored first information derived from the first prediction mode, the second information referring to the second prediction mode, or both.

9. The decoding method of claim 1, wherein the stored first information derived from the first prediction mode, the second information referring to the second prediction mode, or both, is used for a subsequent coding block to reference.

10. The decoding method of claim 1, further comprising:
    combining the first prediction samples and the second prediction samples using a weighted sum to generate the single set of combined prediction samples.

11. An apparatus configured to decode video data, the apparatus comprising a processor in communication with memory, the processor being configured to execute instructions stored in the memory that cause the processor to:
    decode a current coding block of a picture of the video data, comprising:
       determining whether both inter prediction and intra prediction are used for generating a single set of combined prediction samples used to reconstruct the current coding block of the picture;

upon determining that both inter prediction and intra prediction are used for generating the single set of combined prediction samples of the current coding block of the picture:
  determine, based on at least one reconstructed reference frame, first prediction samples for the current coding block generated using a first prediction mode, wherein the first prediction mode comprises an inter-prediction merge mode;
  determine, based on at least one spatial neighboring block to the current coding block, second prediction samples for the current coding block generated using a second prediction mode, wherein the second prediction mode comprises an intra prediction mode;
  combining the first prediction samples and the second prediction samples to generate the singe set of combined prediction samples;
  storing first information derived from the first prediction mode, second information referring to the second prediction mode, or both; and
  reconstructing the current coding block based on the single set of combined prediction samples for the current coding block of the picture.

12. An encoding method for encoding video data, the method comprising:
  encoding a current coding block of a picture of the video data, comprising:
  determining whether both inter prediction and intra prediction are used to generate a single set of combined prediction samples to encode the current coding block of the picture;
  upon determining that both inter prediction and intra prediction are used for generating the single set of combined prediction samples of the current coding block of the picture:
  generating, based on at least one reference frame, first prediction samples for the current coding block using a first prediction mode, wherein the first prediction mode comprises an inter-prediction merge mode;
  generating, based on at least one spatial neighboring block to the current coding block, second prediction samples for the current coding block using a second prediction mode, wherein the second prediction mode comprises an intra prediction mode;
  combining the first prediction samples and the second prediction samples to generate the single set of combined prediction samples for the current coding block;
  storing first information derived from the first prediction mode, second information referring to the second prediction mode, or both; and
  encoding the current coding block based on the single set of combined prediction samples for the current coding block of the picture.

13. The encoding method of claim 12, further comprising encoding a second coding block that is a subsequent coding block to the current coding block based on the stored first information derived from the first prediction mode, the second information referring to the second prediction mode, or both.

14. The encoding method of claim 12, further comprising:
  encoding a subsequent coding block based on the first information derived from the first prediction mode, the second information referring to the second prediction mode, or both.

15. The encoding method of claim 12, further comprising generating a list of most probable modes used in intra prediction for a subsequent coding block to the current coding block according to the second prediction mode.

16. The encoding method of claim 15, further comprising encoding the subsequent coding block using intra prediction with second information derived from prediction data determined based on at least one spatial neighboring block to the current coding block as a candidate.

17. The encoding method of claim 12, wherein only when subsequent coding blocks and the current coding block belong to a same CTU, a same frame, or both, the subsequent coding blocks uses at least part of the stored first information derived from the first prediction mode, the second information referring to the second prediction mode, or both.

18. The encoding method of claim 12, wherein the stored first information derived from the first prediction mode, the second information referring to the second prediction mode, or both, is used for a subsequent coding block to reference.

19. The encoding method of claim 12, further comprising:
  combining the first prediction samples and the second prediction samples using a weighted sum to generate the single set of combined prediction samples.

20. The decoding method of claim 1, wherein storing the first information derived from the first prediction mode, the second information referring to the second prediction mode, or both, comprises storing the first information derived from the first prediction mode.

21. The decoding method of claim 1, wherein storing the first information derived from the first prediction mode, the second information referring to the second prediction mode, or both, comprises storing the second information derived from the second prediction mode.

* * * * *